(12) United States Patent
Mellon et al.

(10) Patent No.: US 10,137,918 B2
(45) Date of Patent: Nov. 27, 2018

(54) CONVEYANCE CART FOR SECURE STORAGE AND TRANSPORT OF CONTAINERS WITH LIDS

(71) Applicants: Ed Mellon, Rancho Santa Fe, CA (US); Claudia Mellon, Rancho Santa Fe, CA (US)

(72) Inventors: Ed Mellon, Rancho Santa Fe, CA (US); Claudia Mellon, Rancho Santa Fe, CA (US)

( * ) Notice: Subject to any disclaimer, the term of this patent is extended or adjusted under 35 U.S.C. 154(b) by 0 days.

(21) Appl. No.: 14/855,636

(22) Filed: Sep. 16, 2015

(65) Prior Publication Data

US 2017/0072979 A1    Mar. 16, 2017

(51) Int. Cl.
*B62B 3/10*     (2006.01)

(52) U.S. Cl.
CPC .......... *B62B 3/104* (2013.01); *B62B 2202/20* (2013.01)

(58) Field of Classification Search
CPC .......... B62B 3/002; B62B 3/02; B62B 3/022; B62B 3/104
See application file for complete search history.

(56) References Cited

U.S. PATENT DOCUMENTS

| | | | |
|---|---|---|---|
| 3,028,015 A * | 4/1962 | Williams | B65F 1/1421 211/83 |
| 7,232,136 B2 * | 6/2007 | Sheehan | B65F 1/1426 280/47.34 |

* cited by examiner

*Primary Examiner* — Erez Gurari
(74) *Attorney, Agent, or Firm* — S&L US IP Attorneys, P.C.; Eric Brandon Lovell; Timothy Marc Shropshire

(57) ABSTRACT

Apparatuses for securing and transporting containers with lids is disclosed. The apparatus comprises a moveable can retaining arm for securing cans and a moveable lid retaining arm for securing the tops of cans. The apparatus further comprises wheels attached to the apparatus to make it mobile. The apparatus further may be extended to increase the number of containers it may carry.

8 Claims, 6 Drawing Sheets

CONVEYANCE CART FOR SECURE STORAGE AND TRANSPORT OF CONTAINERS WITH LIDS

PRIORITY

This application claims priority to provisional application Ser. No. 62/050,821 filed on Sep. 16, 2014 titled "A Cart for Secure Storage and Transportation of Garbage Cans" which is incorporated by reference herein, for all purposes.

FIELD OF DISCLOSURE

Disclosed aspects are directed to secure mechanisms to transport containers with lids. In a particular embodiment, an exemplary embodiment is directed to a cart for the securing and transporting trash cans with lids.

BACKGROUND

Transporting containers to and from collection areas can require multiple trips and can be a time consuming and dirty process. Commonly, containers, such as trash cans are subject to spilling their contents by being bumped or run over.

Animals also can find containers such as trash cans an attractive target and will remove lids from the cans and rip through trash bags to search for scraps of food therein.

Additionally containers, such as trash cans, are commonly transported by hand using handles on the can. It is common for such cans to be dirty and in transporting these trash cans dirt and smell can be transferred to the clothes of those transporting such cans. Accordingly improved methods of storing and transporting cans with lids are needed.

Throughout this disclosure trash cans will be used to illustrate inventive aspects of the present disclosure. Trash cans are chosen as a familiar example of containers with lids, but the present inventive aspects are not limited to trash cans. Likewise throughout this disclosure the term "cans" is used and is identically with the term "containers with lids" or "cans with lids."

SUMMARY

Exemplary aspects of the invention are directed to systems and method for transporting materials in cans with lids.

Accordingly, an exemplary aspect is directed to a conveyance cart. The conveyance cart comprises a can enclosure, having a can retaining arm hingeably coupled to the can enclosure. The can enclosure also has a lid retaining arm hingebley coupled to the can enclosure for securing the lids on cans. The conveyance cart further includes wheels coupled to the conveyance cart to provide mobility to the conveyance cart.

An embodiment is directed to an extendable conveyance cart that can be extended to accommodate additional cans to increase the capacity of the conveyance cart.

BRIEF DESCRIPTION OF THE DRAWINGS

The accompanying drawings are presented to aid in the description of aspects of the present invention and are provided solely for illustration, however the teachings of this disclosure are not limited to the examples depicted in the drawings and other variations are possible within the scope of the present inventive teachings.

The inventive teachings herein are described in terms of garbage cans with lids. It should be obvious that the teachings herein can be applied to a variety of containers of many shapes. Garbage cans with lids were selected to illustrate the teachings herein as an example that will be familiar to a majority of readers.

DETAILED DESCRIPTION

Aspects of the invention are disclosed in the following description and related drawings directed to specific aspects of the invention. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, and/or components, but do not preclude the presence or addition of one or more other features, elements, and components.

Figure 1:
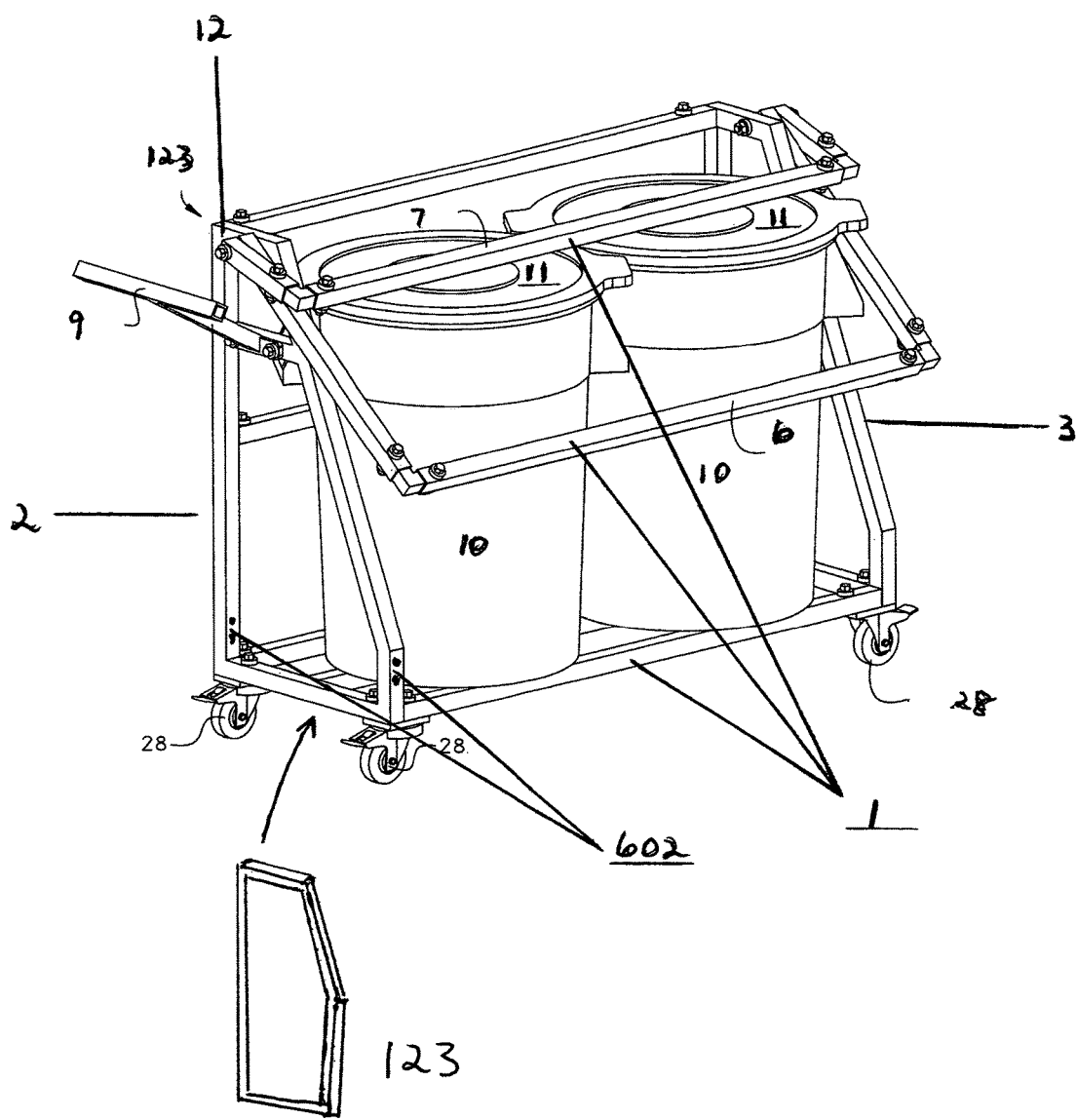
FIG. 1 is a graphical illustration of aspects of the invention in an embodiment of the invention in which two garbage cans are secured for storage and transport.

FIG. 1 is a graphical illustration of aspects of the invention in an embodiment of the invention in which two garbage cans are secured for storage and transport. The front mounting frame 3 comprises a sloping frame portion made from square iron metal framing as is the majority of the illustrative embodiments herein. There is no requirement that embodiments of the present invention be made of square iron metal framing and any other suitable material including, but not limited to, other metals, plastics and the like. The front mounting frame is sloped so that a can retaining arm can secure the trash cans 10 in place. The front mounting frame 3 is shown sloped to illustrate that the can retaining arm can secure the cans 10 in place. Those skilled in the art will realize that any mechanism which allows the can retaining arm 6 to secure the cans 10 can be used. For example if the front mounting frame 3 were square instead of sloped a notch could be added to the front mounting frame 3 to allow the can retaining arm to contact and thereby secure cans 10.

Figure 2:
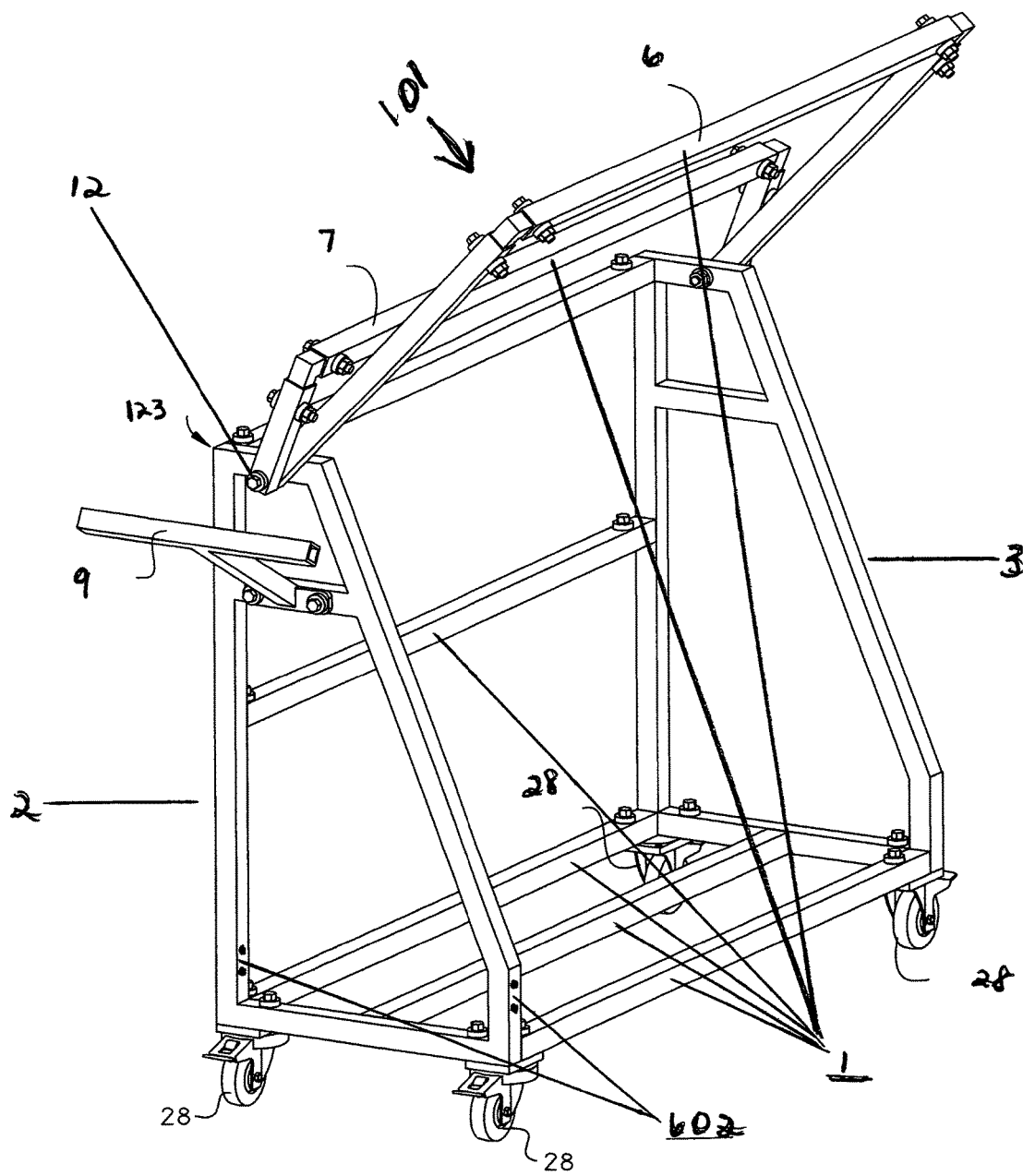
FIG. 2 is a graphical illustration of a secure conveyance for storing and transporting garbage cans with the cans removed for illustrative purposes and to better show the can enclosure.

The front mounting frame 3 and rear mounting frame 2 and horizontal members 1 form the can enclosure. The can enclosure is basically the conveyance cart 101 as shown in FIG. 1 and FIG. 2 without optional handle 9, retaining arms 6 and 7 and wheels 28.

Can retaining arm 6 is movable by virtue of the through bolt 12. Bolt 12 allows the can retaining arm 6 to be raised to insert cans 10 into the cart and then lowered to contact and secure the cans 10. Bolt 12 is used as a hinge to provide movability to can retaining arm 6, though any hinge mechanism which allows the can retaining arm to be raised and lowered can be used. The cans 10 are secured in place by the can retaining arm 6 which is then held in a lowered position by gravity, though any tension mechanism 103 such as a spring or stretchable strap may be used to provide additional can retaining arm 6 securing tension if desired, by coupling the tension mechanism between the retaining arm 6 and the mounting frame 3.

Lid retaining arm 7 can be used to secure garbage can lids 11. Similarly to the can retaining arm 6 the lid retaining arm 7 can be hingeably connected to the rear of the frame 2 by virtue of bolt 12, or other suitable hinge mechanism. The lid retaining arm 7 and the can retaining arm 6 are illustrated as hingeable by virtue of bolt 12. In FIG. 1 both the lid retaining arm 7 and the can retaining arm 6 are illustrated as hingeably coupled to the same hinging mechanism, bolt 12, though they need not be. The lid retaining arm 7 and the can retaining arm 6 may have separate hinging mechanisms.

The front mounting frame 3 and rear mounting frame 2 form the side mounting frame 123. The lid retaining arm 7 and the can retaining arm 6 can be attached as shown in FIG. 1. Either or both may be placed inside of the perimeter of the side mounting frame 123.

There are two side mounting frames 123 which are coupled to each other via four to five horizontal members 1. The horizontal members 1 form the floor and back of the cart 101. The conveyance cart additionally is mounted on wheels 28 to make the can enclosure mobile.

Additionally a handle 9 may be coupled to the can enclosure. It may be hingeably mounted to the side mounting frame 123 or may be coupled anywhere convenient on the can enclosure. There may be several handles 9 and they may be coupled to the can enclosure in a hingeable fashion though there is not a requirement that the handle be hingeable. A handle(s) may be hingeable, removable or a combination of both.

FIG. 2 is a graphical illustration of a secure conveyance 123 for storing and transporting garbage cans with the cans removed for illustrative purposes. In FIG. 1 and FIG. 2 the embodiment of the conveyance cart 101 is illustrated as having lockable wheels 28, though the cart could be realized not having lockable wheels they provide an advantage for conveyances 101 that are used on non-flat and sloped surfaces.

In FIG. 2 the side mounting frames 2 and 3 are coupled to each other using cross members 1.

Figure 3:
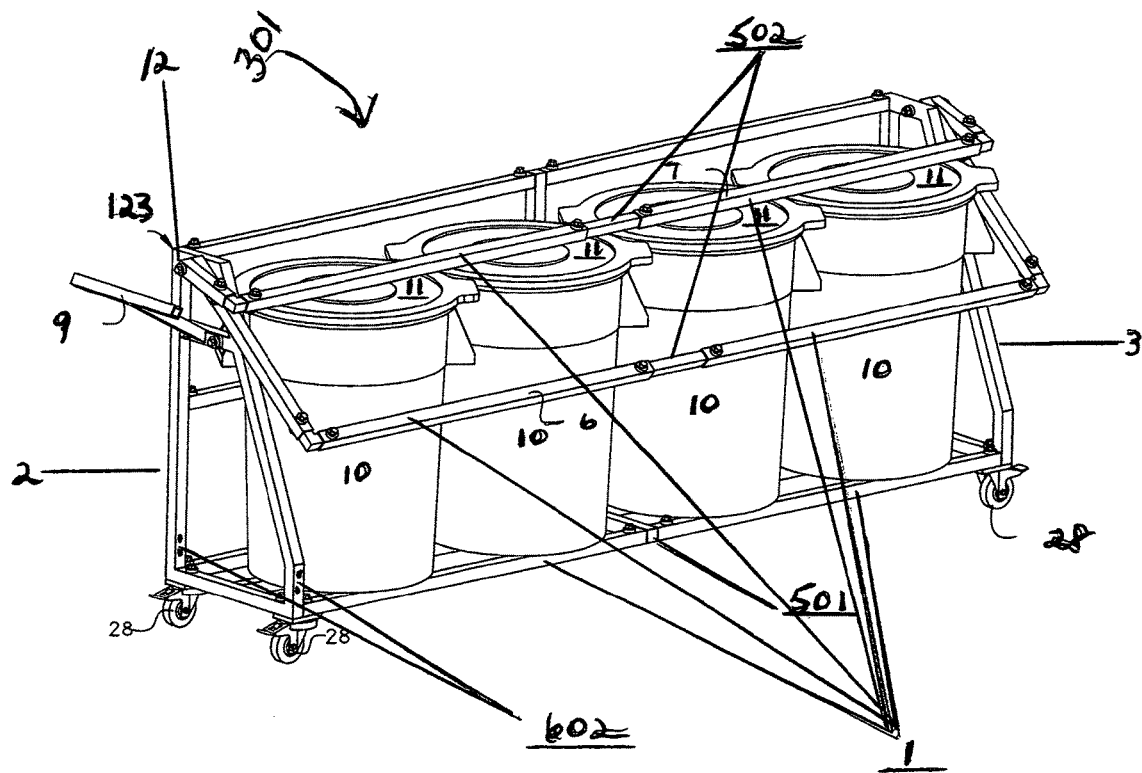
FIG. 3 is a graphical illustration of aspects of the invention in an embodiment of the invention in which four garbage cans are secured for storage and transport.

FIG. 3 is a graphical illustration of aspects of the invention in an embodiment of the invention in which four garbage cans 10 are secured for storage and transport. The embodiment 301, as seen in FIG. 3, can be realized by extending the cross members 1 and retaining arm 6 and lid retaining arm 7, which may be extended by coupling two cross members together using an extender coupling 502.

Figure 4:
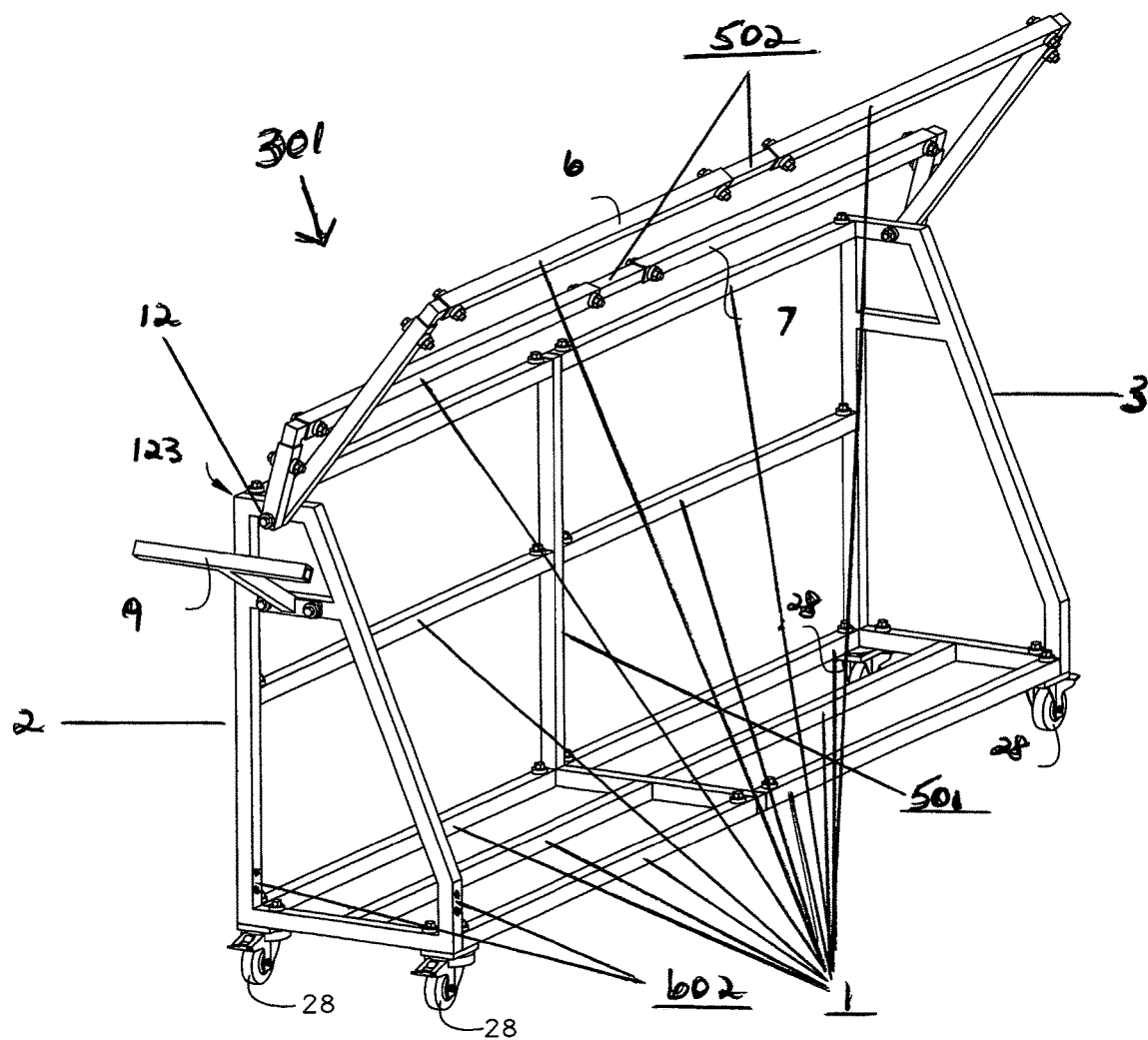
FIG. 4 is a graphical illustration of aspects of the invention in an extended embodiment version of the invention in which more than two garbage cans are secured for storage and transport.

FIG. 4 is a graphical illustration of aspects of the invention in an extended version embodiment of the invention in which more than two garbage cans can be secured for storage and transport. The conveyance cart cross members 1 may be extended using a coupler such as L-Bar 501 Retaining arm 6 and lid retaining arm 7, may be extended for example using extender coupling 502.

Figure 5:
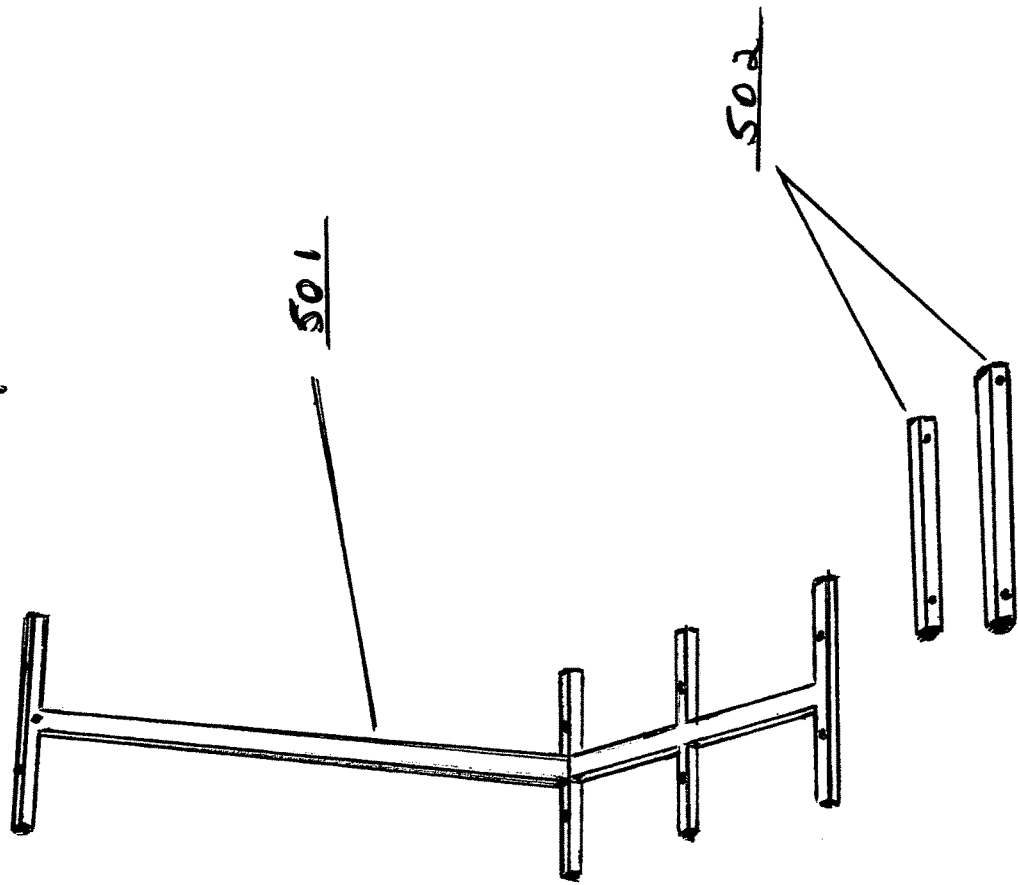
FIG. 5 is a graphical illustration of components which may be used to extend the can carrying capacity of the conveyance cart.

FIG. 5 is a graphical illustration of L-Bar 501. L-Bar 501 is combined with additional horizontal members 1. Additionally extending couplers 502 are combined with two additional horizontal members 1 to lengthen retaining arms 6 and 7. By using additional horizontal members 1 the cart capacity is doubled. Smaller or larger horizontal members 1 may be used both to lengthen the cart and/or to fabricate the embodiment in FIG. 1 and FIG. 2. However there are advantages to use a standard size for both, such as limiting the number of different sizes kept in inventory for cart fabrication.

Figure 6:
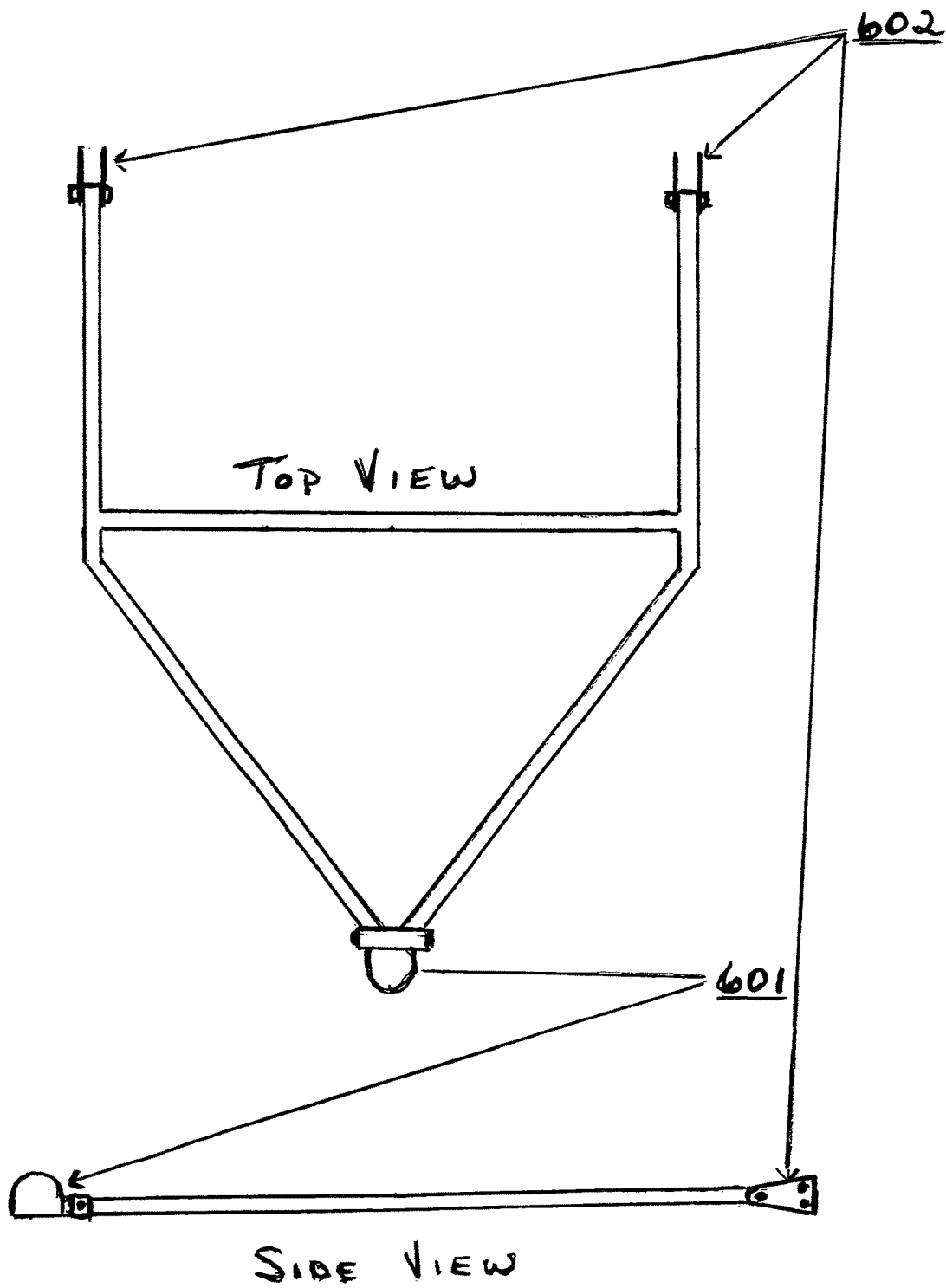
FIG. 6 is a graphical illustration of components which may be combined with the conveyance cart which allow the cart to be towed.

FIG. 6 is a graphical illustration of a conveyance cart hitch attachment. Such a hitch attachment can be used by a vehicle having a hitch ball to tow the conveyance cart. Mounting attachment 601 couples at mounting frame point 602, which is a combination of front mounting frame portion 3 and rear mounting frame 2. Mounting attachment 602 can be hingeabley or solidly coupled to conveyance cart 101. Mounting attachment 601 may be hingeabley or solidly coupled to mounting frame 602.

While the foregoing disclosure shows illustrative aspects of the invention, it should be noted that various changes and modifications could be made herein without departing from the scope of the invention as defined by the appended claims. Furthermore, although elements of the invention may be described or claimed in the singular, the plural is contemplated unless limitation to the singular is explicitly stated.

We claim:

1. A conveyance cart comprising:
   a) a can enclosure including:
      i) a first side mounting frame;
      ii) a second side mounting frame;
      iii) one or more L-bars positioned between the first side mounting frame and the second side mounting frame;
      iv) a plurality of horizontal members interconnecting the one or more L-bars and the first side mounting frame and the second side mounting frame, wherein a length of the can enclosure, defined by a distance from the first side mounting frame to the second side mounting frame, is adjustable; and
      v) a plurality of wheels coupled to a base of the can enclosure;
   b) a can retaining arm hingedly coupled to an upper portion of the can enclosure; and
   c) a lid retaining arm hingedly coupled to an upper portion of the can enclosure, wherein the can retaining arm and the lid retaining arm each include at least one extender coupling, wherein a length of the can retaining arm and the lid retaining arm is adjustable.

2. The conveyance cart of claim 1, further comprising at least one handle coupled to the can enclosure.

3. The conveyance cart of claim 2, wherein the at least one handle is hingedly coupled one of the first side mounting frame or the second side mounting frame.

4. The conveyance cart of claim 2, wherein the at least one handle is removable.

5. The conveyance cart of claim 1, further comprising a hitch coupled to the conveyance cart, wherein the hitch releasably mounts to a vehicle.

6. The conveyance cart of claim 1, further comprising a tension mechanism coupled between the first side mounting frame, the second side mounting frame, and the can retaining arm.

7. The conveyance cart of claim 1, wherein at least one of the wheels is lockable.

8. The conveyance cart of claim 1, wherein an adjustment in the length of the can enclosure is equal to an adjustment in the length of the can retaining arm and the lid retaining arm.

* * * * *